(12) United States Patent
Cox

(10) Patent No.: US 10,083,452 B1
(45) Date of Patent: Sep. 25, 2018

(54) METHOD AND SYSTEM FOR IDENTIFYING POTENTIALLY FRAUDULENT BILL AND INVOICE PAYMENTS

(71) Applicant: Intuit Inc., Mountain View, CA (US)

(72) Inventor: Nedda Cox, Niwot, CO (US)

(73) Assignee: Intuit Inc., Mountain View, CA (US)

( * ) Notice: Subject to any disclaimer, the term of this patent is extended or adjusted under 35 U.S.C. 154(b) by 138 days.

(21) Appl. No.: 15/188,558

(22) Filed: Jun. 21, 2016

(51) Int. Cl.
*G06Q 30/00* (2012.01)
*G06Q 40/00* (2012.01)

(52) U.S. Cl.
CPC ......... *G06Q 30/0185* (2013.01); *G06Q 40/12* (2013.12)

(58) Field of Classification Search
CPC ..................................... G06Q 40/20
See application file for complete search history.

(56) References Cited

U.S. PATENT DOCUMENTS

| | | |
|---|---|---|
| 6,826,536 B1 | 11/2004 | Forman |
| 7,686,214 B1 | 3/2010 | Shao et al. |
| 8,639,522 B2 | 1/2014 | Pathria et al. |
| 8,776,168 B1 | 7/2014 | Gibson et al. |
| 8,966,640 B1 | 2/2015 | Peddada et al. |
| 2003/0229519 A1 | 12/2003 | Eidex et al. |
| 2007/0294104 A1 | 12/2007 | Boaz et al. |
| 2007/0294195 A1 | 12/2007 | Curry et al. |
| 2008/0086342 A1 | 4/2008 | Curry et al. |
| 2010/0077445 A1 | 3/2010 | Schneider et al. |
| 2011/0231257 A1* | 9/2011 | Winters ................. G06Q 30/02 705/14.53 |
| 2012/0030076 A1 | 2/2012 | Checco et al. |
| 2012/0030079 A1 | 2/2012 | Slater et al. |
| 2012/0226591 A1 | 9/2012 | Ramsey et al. |
| 2013/0117278 A1 | 5/2013 | Martens et al. |
| 2014/0278479 A1 | 9/2014 | Wang et al. |
| 2015/0046181 A1 | 2/2015 | Adjaoute |
| 2015/0161622 A1 | 6/2015 | Hoffmann et al. |
| 2015/0220734 A1 | 8/2015 | Nalluri et al. |
| 2016/0063645 A1 | 3/2016 | Houseworth et al. |
| 2016/0112451 A1 | 4/2016 | Jevans |
| 2016/0148321 A1 | 5/2016 | Ciaramitaro et al. |

FOREIGN PATENT DOCUMENTS

KR 10-2006-0090834 8/2006

* cited by examiner

*Primary Examiner* — Russell S Glass
(74) *Attorney, Agent, or Firm* — Hawley Troxell Ennis & Hawley LLP; Philip McKay

(57) ABSTRACT

Financial transaction data representing financial transactions associated with a user is obtained from two or more sources through a personal financial management and bill payment system. The financial transaction data is then analyzed to identify recurring payments to the same payees, and/or for the same products or services, and generate baseline bill payment and/or invoice data for the same payees, and/or for the same products or services. Financial transaction data associated with the user is then monitored and compared with the baseline bill payment and/or invoice data and if a bill and/or invoice payment is identified for a payee, and/or for a service or product, that is outside a defined range of the baseline amount or frequency associated with that payee, and/or for that service or product, the bill and/or invoice payment is identified as a potentially fraudulent financial transaction.

30 Claims, 2 Drawing Sheets

METHOD AND SYSTEM FOR IDENTIFYING POTENTIALLY FRAUDULENT BILL AND INVOICE PAYMENTS

BACKGROUND

Many consumers find it difficult to keep track of their financial transactions. This is particularly true for senior citizens and other consumers who may have diminished ability to accurately track what payments they have made, and the amounts of those payments. In many cases, consumers who find it hard to track their financial transactions, for whatever reason, rely on others, such as friends, family, agents, or even the potential payees of financial transactions, to help them ensure they are paying their bills and invoices, and that the proper amounts are being paid.

Unfortunately, due to their diminished ability to accurately track payments they have made, and/or by relying on others to help them make and track payments, these consumers become susceptible to various forms of payment fraud including, but not limited to: overpayment on a bill or invoice; making multiple payments for the same bill or invoice; making payment for services and/or products not delivered; and/or simply fictitious payments.

Given that, by definition, these consumers have diminished ability to accurately track payments they have made, and/or are relying on others to help them make and track payments, it is often the case that these consumers either lack the capability to identify payment fraud, or lack the motivation to monitor and/or double check the activities of those they have entrusted to help them make and track payments.

Given that the population in the United States is aging rapidly with the ascension of "baby boomers" into the ranks of the retired and senior citizen class, the problem of fraudulent bill and invoice payments is rapidly becoming a national emergency. Currently, 26 percent of all fraud perpetrated in the United States is perpetrated against consumers that are 65 or older and the estimated cost of financial fraud in the United States is 40 to 50 billion annually.

Consequently, there is currently a long standing technical problem in the bill and invoice payment system arts in that there is currently no user friendly, simple to implement, and highly accurate way to detect fraudulent bill and invoice payment activity that monitors and processes financial transaction data from multiple sources of financial transaction data associated with a consumer in an integrated and holistic manner.

What is needed is a technical solution that is capable of detecting fraudulent bill and invoice payment activity conducted through any one of multiple sources of financial transaction data associated with a consumer in an integrated and holistic manner.

SUMMARY

In accordance with one embodiment, financial transaction data representing financial transactions associated with a user is obtained from two or more sources through a personal financial management and bill payment system. In one embodiment, the financial transaction data is then analyzed to identify recurring payments to the same payees, and/or for the same products or services, indicated in the financial transaction data associated with the user.

In one embodiment, recurring payment data representing recurring payments to the same payees, and/or for the same products or services, indicated in the financial transaction data associated with the user is then analyzed to generate baseline bill payment and/or invoice data for the payees, and/or for the same products or services. In one embodiment, the baseline bill payment and/or invoice data includes data indicating the frequency, amount, payee, and/or product or service, associated with recurring bills and/or invoices paid by the user.

In one embodiment, financial transaction data associated with the user is then monitored and compared with the baseline bill payment and/or invoice data. In one embodiment, if a bill and/or invoice payment is identified for a payee, and/or for a service or product, that is outside a defined range of the baseline amount or frequency associated with that payee, and/or for that service or product, the bill and/or invoice payment is identified and processed as a potentially fraudulent financial transaction and appropriate protection measures are taken.

Consequently, disclosed herein is a method and system for automatically detecting potentially fraudulent bill and invoice payment activity conducted through any one of multiple sources of financial transaction data associated with a user. Therefore, disclosed herein is an efficient, effective, and dynamically adaptable technical solution to the long standing technical problem in the bill and invoice payment system arts of providing a user friendly, simple to implement, and highly accurate way to detect fraudulent bill and invoice payment activity that monitors and processes financial transaction data from multiple sources of financial transaction data associated with a consumer in an integrated and holistic manner.

In accordance with one embodiment, a personal financial management and bill payment system is provided to users of the personal financial management and bill payment system. In accordance with one embodiment, the personal financial management and bill payment system is provided and/or accessed using one or more processors.

Currently, several personal financial management and bill payment systems are available to help a personal financial management and bill payment system user, or any authorized party acting on behalf of a personal financial management and bill payment system user, obtain financial transaction data representing financial transactions conducted by the user, process/analyze the financial transaction data, display categorized financial transaction data, generate financial transaction reports, generate bills due and payment due reports, and/or make manual, semi-automated, and/or automatic bill payments through the personal financial management and bill payment system.

Typically personal financial management and bill payment systems help users manage their finances and/or track their expenditures/financial transactions by providing a centralized interface with multiple banks, credit card companies, and various other financial institutions, for electronically obtaining, identifying, and categorizing the user's financial transaction data. Consequently, personal financial management and bill payment systems can typically obtain financial transaction data from multiple sources, as opposed to financial institution and/or credit card systems that can only obtain financial transaction data from a single source.

Currently, personal financial management and bill payment systems typically obtain electronic financial transaction data, such as payee data, payment amount data, transaction date data, etc. via communication with multiple banks, credit card providers, or other financial institutions, using electronic data transfer systems, or various other systems for obtaining/transferring financial transaction data.

As used herein, the term "bill" includes, but is not limited to, an account statement or other potentially recurring cost and financial transaction, typically associated with larger financial institutions, credit card companies, and/or well-known payees. Examples of bills include, but are not limited to: rent payments, utility payments, credit card payments, grocery store payments, vehicle costs, etc. In contrast to the term "bill", herein the term "invoice" includes, but is not limited to, costs associated with a specific product and/or service provided by a business and for which payment is requested via the invoice document. Typically, invoices are associated with smaller and/or local companies/payees and often represent a request for payment of non-recurring expense associated with specific products and/or services rendered, even though multiple, and even recurring identical, invoices can be generated by the same business for the same customer if multiple products and/or services, even the same products and/or services, are provided.

Herein the terms "payment" and/or "payment due" are used interchangeably and include any payment owed by a first party, i.e., payor party, to a second party, i.e., a payee party. Consequently, as used herein, the terms "payment" and/or "payment due" include both "bills" and "invoices."

Personal financial management and bill payment systems have proven to be valuable and highly flexible systems often heavily relied upon by the users of the personal financial management and bill payment systems. As noted, this is particularly true given that personal financial management and bill payment systems, unlike financial management and/or credit card account systems, obtain financial transaction data from multiple sources of both bill payment and invoice payment data.

In accordance with one embodiment, access to personal financial management and bill payment system user financial transaction data representing financial transactions associated with users of the personal financial management and bill payment system is obtained using one or more processors. In one embodiment, the personal financial management and bill payment system user financial transaction data includes financial transaction data from two or more sources of financial transaction data.

In accordance with one embodiment, the personal financial management and bill payment system user financial transaction data is stored in a partitioned personal financial management and bill payment system user financial transaction data section of a memory.

In accordance with one embodiment, the personal financial management and bill payment system user financial transaction data associated with a given user is analyzed to identify recurring payment financial transaction data representing recurring payments made by the user.

In accordance with one embodiment, for each identified recurring payment financial transaction associated with the user, the recurring payment financial transaction data is further analyzed to determine baseline recurring payment data associated with that recurring payment financial transaction. In accordance with one embodiment, the recurring payment financial transaction data and the baseline recurring payment data associated with the recurring payment financial transaction data are correlated and the correlated recurring payment financial transaction data and the baseline recurring payment data associated with the recurring payment financial transaction data is then stored in a baseline recurring payment database.

In accordance with one embodiment, once the baseline recurring payment data associated with the user is identified and stored, current personal financial management and bill payment system user financial transaction data representing current financial transactions associated with the user of the personal financial management and bill payment system is obtained and/or monitored. In accordance with one embodiment, the current personal financial management and bill payment system user financial transaction data is then analyzed to identify current recurring payment financial transaction data in the current personal financial management and bill payment system user financial transaction data.

In accordance with one embodiment, when current recurring payment financial transaction data in the current personal financial management and bill payment system user financial transaction data is identified, the current recurring payment financial transaction data and the baseline recurring payment data in baseline recurring payment database are analyzed and/or compared. In accordance with one embodiment, if the current recurring payment financial transaction data and the baseline recurring payment data do not match to a defined level of similarity, the current recurring payment financial transaction represented by the current recurring payment financial transaction data is then identified as a potentially fraudulent financial transaction. In accordance with one embodiment, once a current recurring payment financial transaction represented by the current recurring payment financial transaction data is identified as a potentially fraudulent financial transaction, status data associated with the current recurring payment financial transaction data is transformed into potentially fraudulent payment financial transaction status data.

In accordance with one embodiment, the potentially fraudulent payment financial transaction data is then subjected to one or more protective actions including, but not limited to: preventing the payment represented by the potentially fraudulent payment financial transaction data from being completed; and/or forwarding the potentially fraudulent payment financial transaction data to a designated representative and/or agent of the user; and/or forwarding the potentially fraudulent payment financial transaction data to a designated representative of the personal financial management and bill payment system; and/or any other one or more protective actions as discussed herein, and/or as known in the art at the time of filing; and/or as developed after the time of filing.

The embodiments disclosed herein provide a method and system for identifying financial transaction data representing potentially fraudulent bill and invoice payments and then automatically taking appropriate action to minimize the adverse effects or any potentially fraudulent bill and invoice payments to be made, or made, through a personal financial management and bill payment system. Therefore, disclosed herein is an efficient, effective, and dynamically adaptable technical solution to the long standing technical problem in the financial management system, payment processing, and invoicing arts of detecting fraudulent bill and invoice payment activity conducted through any one of multiple sources of financial transaction data associated with a consumer in an integrated and holistic manner.

However, the disclosed method and system for identifying potentially fraudulent bill and invoice payments does not encompass, embody, or preclude other forms of innovation in the area of fraud detection and/or financial transaction bill payment processing and invoicing. In addition, the disclosed method and system for identifying potentially fraudulent bill and invoice payments is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments, and the management and processing of large amounts of data, i.e., "big data." Consequently, the disclosed method and system for identifying potentially fraudulent bill and invoice payments is not directed to, does not encompass, and is not merely, an abstract idea or concept.

In addition, the disclosed method and system for identifying potentially fraudulent bill and invoice payments provides for significant improvements to the technical fields of fraud detection, senior citizen/consumer protection, electronic transaction data processing, invoicing, financial transaction categorization, information dissemination, data processing, data management, data filtering and mining, automatic electronic bill payment, and user experience.

In addition, the disclosed method and system for identifying potentially fraudulent bill and invoice payments provides for the entry, processing, and dissemination, of only potentially legitimate portions of data; thereby eliminating unnecessary data analysis and correction before resources are allocated to processing, and/or correcting, fraudulent financial transaction data, and/or the, fraudulent financial transaction data is further transmitted/distributed. Consequently, using the disclosed method and system for identifying potentially fraudulent bill and invoice payments results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing the method and system for identifying potentially fraudulent bill and invoice payments.

Figure 1:
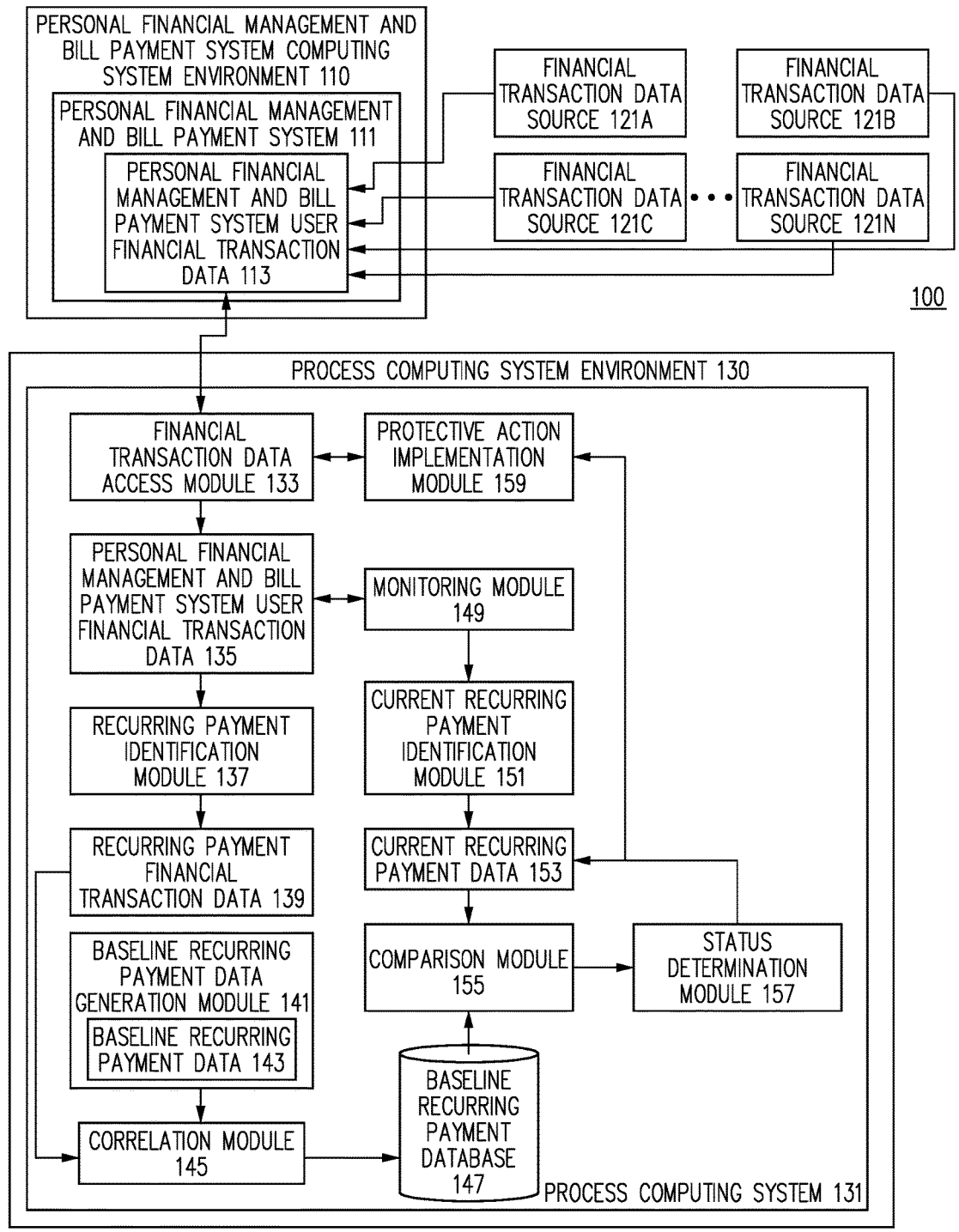
FIG. 1 is a high level functionality-based block diagram of a hardware and production environment of a system and method for identifying potentially fraudulent bill and invoice payments, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

Term Definitions

Herein, the term "personal financial management and bill payment system" includes, but is not limited to, the following: computing system, desktop system, mobile system, and/or wearable device implemented, and/or online, and/or web-based, storage based, persistence based, personal financial transaction aggregation and/or processing systems, services, packages, programs, modules, or applications; computing system, desktop system, mobile system, and/or wearable device implemented, and/or online, and/or web-based, storage based, persistence based, personal financial management and budgeting systems, services, packages, programs, modules, or applications; computing system, desktop system, mobile system, and/or wearable device implemented, and/or online, and/or web-based, storage based, persistence based, personal data management systems, services, packages, programs, modules, or applications; computing system, desktop system, mobile system, and/or wearable device implemented, and/or online, and/or web-based, storage based, persistence based, personal accounting systems, services, packages, programs, modules, or applications; personal electronic tax preparation systems, services, packages, programs, modules, or applications; and various other personal electronic data management systems, services, packages, programs, modules, or applications, whether known at the time of filing, or as developed later.

Specific examples of personal financial management and bill payment systems include, but are not limited to the following: Mint™, available from Intuit, Inc. of Mountain View, Calif.; Mint Online™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

Herein, the term "business invoicing system" includes, but is not limited to, any system through which a business can generate, and/or submit, and/or process invoices requesting payment for products and/or services provided by the business to customers of the business. Therefore, the term "business invoicing system" includes, but is not limited to, the following: computing system, desktop system, mobile system, and/or wearable device implemented, and/or online, and/or web-based, storage based, persistence based, business accounting and/or invoicing systems, services, packages, programs, modules, or applications; computing system, desktop system, mobile system, and/or wearable device implemented, and/or online, and/or web-based, storage based, persistence based, business financial transaction aggregation and/or processing systems, services, packages, programs, modules, or applications; computing system, desktop system, mobile system, and/or wearable device implemented, and/or online, and/or web-based, storage based, persistence based, business financial management and budgeting systems, services, packages, programs, modules, or applications; computing system, desktop system, mobile system, and/or wearable device implemented, and/or online, and/or web-based, storage based, persistence based, business management systems, services, packages, programs, modules, or applications; business electronic tax preparation systems, services, packages, programs, modules, or applications; and various other business electronic data management systems, services, packages, programs, modules, or applications, whether known at the time of filing, or as developed later.

Specific examples of "business invoicing systems" include, but are not limited to, the following: QuickBooks™, available from Intuit, Inc. of Mountain View, Calif.; QuickBooks Online™, available from Intuit, Inc. of Mountain View, Calif.; QuickBooks Self-Employed™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

Herein, the terms "software system" and "software application" are used interchangeably and can be, but are not limited to, any data management system implemented on a computing system, accessed through one or more servers, accessed through a network, accessed through a cloud, and/or provided through any system or by any mechanism and/or process, as discussed herein, and/or as known in the art at the time of filing, and/or as developed after the time of filing, that gathers/obtains data, from one or more sources and/or has the capability to analyze at least part of the data.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein, the term "party," "user," "user consumer," and "customer" are used interchangeably to denote any party and/or entity that interfaces with, and/or to whom information is provided by, the method and system for identifying potentially fraudulent bill and invoice payments described herein, and/or a person and/or entity that interfaces with, and/or to whom information is provided by, the method and system for identifying potentially fraudulent bill and invoice payments described herein, and/or a legal guardian of person and/or entity that interfaces with, and/or to whom information is provided by, the method and system for identifying potentially fraudulent bill and invoice payments described herein, and/or an authorized agent of any party and/or person and/or entity that interfaces with, and/or to whom information is provided by, the method and system for identifying potentially fraudulent bill and invoice payments described herein. For instance, in various embodiments, a user can be, but is not limited to, a person, a commercial entity, an application, a service, and/or a computing system.

Herein, the term "financial transaction" includes, but is not limited to, any interaction between two or more parties involving the transfer, or re-categorization, of funds between the parties. Herein, the term "financial transaction data" includes, but is not limited to, electronic data representing at least one financial transaction and that is capable of being processed by a processor, and/or stored in a memory, and/or is otherwise machine readable.

Herein, the term "product and/or service provider" includes any party and/or entity that is associated with a user through a financial transaction represented by financial transaction data.

As used herein, the term "bill" includes, but is not limited to, an account statement or other potentially recurring cost and financial transaction. Examples of bills include, but are not limited to: rent payments, utility payments, credit card payments, grocery store payments, vehicle costs, etc.

In contrast to the term "bill", herein the term "invoice" includes, but is not limited to costs associated with a specific product and/or service provided by a business and for which full payment is requested via the invoice document. A given invoice is therefore typically a non-recurring expense and/or is associated with specific products and/or services rendered, even though multiple, and even recurring identical, invoices can be generated by the same business for the same customer if multiple products and/or services, even the same products and/or services, are provided.

Herein the terms "payment" and/or "payment due" are used interchangeably and include any payment owed by a first party, i.e., payor party, to a second party, i.e., a payee party. Consequently, as used herein, the terms "payment" and/or "payment due" include both "bills" and "invoices."

DETAILED DISCLOSURE

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

In accordance with one embodiment, financial transaction data representing financial transactions associated with a user is obtained from two or more sources through a personal financial management and bill payment system. In one embodiment, the financial transaction data is then analyzed to identify recurring payments to the same payees, and/or for the same products or services, indicated in the financial transaction data associated with the user.

In one embodiment, recurring payment data representing recurring payments to the same payees, and/or for the same products or services, indicated in the financial transaction data associated with the user is then analyzed to generate baseline bill payment and/or invoice data for the payees, and/or for the same products or services. In one embodiment, the baseline bill payment and/or invoice data includes data indicating the frequency, amount, payee, and/or product or service, associated with recurring bills and/or invoices paid by the user.

In one embodiment, financial transaction data associated with the user is then monitored and compared with the baseline bill payment and/or invoice data. In one embodiment, if a bill and/or invoice payment is identified for a payee, and/or for a service or product, that is outside a defined range of the baseline amount or frequency associated with that payee, and/or for that service or product, the bill and/or invoice payment is identified and processed as a potentially fraudulent financial transaction and appropriate protection measures are taken.

Consequently, disclosed herein is a method and system for automatically detecting potentially fraudulent bill and invoice payment activity conducted through any one of multiple sources of financial transaction data associated with a user. Therefore, disclosed herein is an efficient, effective, and dynamically adaptable technical solution to the long standing technical problem in the bill and invoice payment system arts of providing a user friendly, simple to implement, and highly accurate way to detect fraudulent bill and invoice payment activity that monitors and processes financial transaction data from multiple sources of financial transaction data associated with a consumer in an integrated and holistic manner.

In one embodiment, a personal financial management and bill payment system is provided using one or more computing systems. In accordance with one embodiment, the personal financial management and bill payment system is provided to users of the personal financial management and bill payment system.

As noted above, herein, the term "personal financial management and bill payment system" includes, but is not limited to, the following: computing system, desktop system, mobile system, and/or wearable device implemented, and/or online, and/or web-based, storage based, persistence based, personal financial transaction aggregation and/or processing systems, services, packages, programs, modules, or applications; computing system, desktop system, mobile system, and/or wearable device implemented, and/or online, and/or web-based, storage based, persistence based, personal financial management and budgeting systems, services, packages, programs, modules, or applications; computing system, desktop system, mobile system, and/or wearable device implemented, and/or online, and/or web-based, storage based, persistence based, personal data management systems, services, packages, programs, modules, or applications; computing system, desktop system, mobile system, and/or wearable device implemented, and/or online, and/or web-based, storage based, persistence based, personal accounting systems, services, packages, programs, modules, or applications; personal electronic tax preparation systems, services, packages, programs, modules, or applications; and various other personal electronic data management systems, services, packages, programs, modules, or applications, whether known at the time of filling, or as developed later.

As noted above, specific examples of personal financial management and bill payment systems include, but are not limited to the following: Mint™, available from Intuit, Inc. of Mountain View, Calif.; Mint Online™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

In accordance with one embodiment, the personal financial management and bill payment system is a financial transaction management and bill payment system through which a user of the financial transaction management and bill payment system is provided the capability to categorize financial transactions and pay the customer user's bills.

In accordance with one embodiment, one or more processors associated with one or more computing systems are utilized to obtain access to personal financial management and bill payment system user financial transaction data representing financial transactions associated with users of the personal financial management and bill payment system.

As noted above, herein, the term "financial transaction" includes, but is not limited to, any interaction between two or more parties involving the transfer, or re-categorization, of funds between the parties. Herein, the term "financial transaction data" includes, but is not limited to, electronic data representing at least one financial transaction and that is capable of being processed by a processor, and/or stored in a memory, and/or is otherwise machine readable.

In accordance with one embodiment, one or more processors associated with one or more computing systems are utilized to obtain access to personal financial management and bill payment system user financial transaction data associated with users of the personal financial management and bill payment system by obtaining access to user account data associated with the users of the personal financial management and bill payment system.

In various embodiments, the personal financial management and bill payment system user financial transaction data includes, but is not limited to, data representing payments made to a payee party on behalf of the user of the personal financial management and bill payment system through the personal financial management and bill payment system, and/or through any account offered by any financial institution or payment system provider.

In one embodiment, the personal financial management and bill payment system user financial transaction data includes, but is not limited to, one or more of; payee data indicating a payee associated with payments identified in the financial transaction data; product data indicating a product associated with payments identified in the payment financial transaction data; service data indicating a service associated with payments identified in the payment financial transaction data; amount data indicating a payment amount associated with payments identified in the financial transaction data; payment date data indicating a payment date associated with payments identified in the financial transaction data; and/or any one or more types of personal financial management and bill payment system user financial transaction data, as discussed herein, and/or as known in the art at the time of filing, and/or as developed after the time of filing.

In one embodiment, the personal financial management and bill payment system user financial transaction data is verified using one or more verification mechanisms and/or processes as discussed herein, and/or as known in the art at the time of filing, and/or as developed or becomes known after the time of filing.

In one embodiment, the personal financial management and bill payment system user financial transaction data obtained is stored in a partitioned personal financial management and bill payment system user financial transaction data section of a memory.

In accordance with one embodiment, one or more processors associated with one or more computing systems are used to analyze the personal financial management and bill payment system user financial transaction data associated with a given user to identify user payee data included in the financial transaction data associated with the user. In one embodiment, the user payee data represents one or more payees associated with the user financial transactions represented by the portion of the user financial transaction data associated with the user.

In one embodiment, the user payee data is verified using one or more verification mechanisms and/or processes as discussed herein, and/or as known in the art at the time of filing, and/or as developed or becomes known after the time of filing.

In accordance with one embodiment, one or more processors associated with one or more computing systems are used to analyze the personal financial management and bill payment system user financial transaction data associated with a given user to identify user product data indicating a product associated with payments identified in the payment financial transaction data associated with the user.

In one embodiment, the user product data represents one or more products associated with the user financial transactions represented by the portion of the user financial transaction data associated with the user.

In one embodiment, the user product data is verified using one or more verification mechanisms and/or processes as discussed herein, and/or as known in the art at the time of filing, and/or as developed or becomes known after the time of filing.

In one embodiment, the user product data is stored in a partitioned user product data section of a memory.

In accordance with one embodiment, one or more processors associated with one or more computing systems are used to analyze the personal financial management and bill payment system user financial transaction data associated with a given user to identify user service data indicating a service associated with payments identified in the payment financial transaction data associated with the user.

In one embodiment, the user service data represents one or more services associated with the user financial transactions represented by the portion of the user financial transaction data associated with the user.

In one embodiment, the user service data is verified using one or more verification mechanisms and/or processes as discussed herein, and/or as known in the art at the time of filing, and/or as developed or becomes known after the time of filing.

In one embodiment, the user service data is stored in a partitioned user service data section of a memory.

In accordance with one embodiment, one or more processors associated with one or more computing systems are used to analyze the personal financial management and bill payment system user financial transaction data associated with a given user to identify user payment date data indicating a payment date associated with payments identified in the payment financial transaction data associated with the user.

In one embodiment, the user payment date data represents one or more payment dates associated with the user financial transactions represented by the portion of the user financial transaction data associated with the user.

In one embodiment, the user payment date data is verified using one or more verification mechanisms and/or processes as discussed herein, and/or as known in the art at the time of filing, and/or as developed or becomes known after the time of filing.

In one embodiment, the user payment date data is stored in a partitioned user payment date data section of a memory.

In accordance with one embodiment, the personal financial management and bill payment system user financial transaction data associated with a user is then analyzed to identify recurring payment financial transaction data representing recurring payments made by the user.

In accordance with one embodiment, the recurring payment financial transaction data includes, but is not limited to, recurring payee data indicating a payee associated with recurring payments identified in the recurring payment financial transaction data.

In accordance with one embodiment, the recurring payment financial transaction data includes, but is not limited to, recurring product data indicating a product associated with recurring payments identified in the recurring payment financial transaction data.

In accordance with one embodiment, the recurring payment financial transaction data includes, but is not limited to, recurring service data indicating a service associated with recurring payments identified in the recurring payment financial transaction data.

In accordance with one embodiment, the recurring payment financial transaction data includes, but is not limited to, recurring payment amount data indicating a payment amount associated with recurring payments identified in the recurring payment financial transaction data.

In accordance with one embodiment, the recurring payment financial transaction data includes, but is not limited to, recurring payment frequency data indicating a frequency of payment associated with recurring payments identified in the recurring payment financial transaction data.

In accordance with one embodiment, the recurring payment financial transaction data includes, but is not limited to, recurring payment date data indicating a date associated with recurring payments identified in the recurring payment financial transaction data.

In accordance with one embodiment, the recurring payment financial transaction data includes, but is not limited to, recurring payment day data indicating a day associated with recurring payments identified in the recurring payment financial transaction data.

In accordance with one embodiment, the recurring payment financial transaction data includes, but is not limited to, any one or more types of recurring payment financial transaction data, as discussed herein, and/or as known in the art at the time of filing, and/or as developed after the time of filing.

In accordance with one embodiment, for each identified recurring payment financial transaction associated with the user, the recurring payment financial transaction data is further analyzed to determine baseline recurring payment data associated with that recurring payment financial transaction.

In accordance with one embodiment, baseline recurring payment data associated with a recurring payment financial transaction includes, but is not limited to, recurring payee data indicating a payee associated with recurring payments identified in the recurring payment financial transaction data.

In accordance with one embodiment, baseline recurring payment data associated with a recurring payment financial transaction includes, but is not limited to, recurring product data indicating a product associated with recurring payments identified in the recurring payment financial transaction data.

In accordance with one embodiment, baseline recurring payment data associated with a recurring payment financial transaction includes, but is not limited to, recurring service data indicating a service associated with recurring payments identified in the recurring payment financial transaction data.

In accordance with one embodiment, baseline recurring payment data associated with a recurring payment financial transaction includes, but is not limited to, recurring payment amount data indicating a payment amount associated with recurring payments identified in the recurring payment financial transaction data.

In accordance with one embodiment, baseline recurring payment data associated with a recurring payment financial transaction includes, but is not limited to, recurring payment frequency data indicating a frequency of payment associated with recurring payments identified in the recurring payment financial transaction data.

In accordance with one embodiment, baseline recurring payment data associated with a recurring payment financial transaction includes, but is not limited to, recurring payment date data indicating a date associated with recurring payments identified in the recurring payment financial transaction data In accordance with one embodiment, baseline recurring payment data associated with a recurring payment financial transaction includes, but is not limited to, recurring payment day data indicating a day associated with recurring payments identified in the recurring payment financial transaction data.

In accordance with one embodiment, baseline recurring payment data associated with a recurring payment financial transaction includes, but is not limited to, any baseline recurring payment data associated with a recurring payment financial transaction as discussed herein, and/or as known in the art at the time of filing, and/or as developed after the time of filing.

In accordance with one embodiment, the recurring payment financial transaction data and the baseline recurring payment data associated with the recurring payment financial transaction data are correlated and the correlated recurring payment financial transaction data and the baseline recurring payment data associated with the recurring payment financial transaction data is then stored in a baseline recurring payment database.

In accordance with one embodiment, once the baseline recurring payment data associated with the user is identified and stored, current personal financial management and bill payment system user financial transaction data representing current financial transactions associated with the user of the personal financial management and bill payment system is obtained from, and/or monitored through, the financial management and bill payment system. In accordance with one embodiment, the current personal financial management and bill payment system user financial transaction data is then analyzed to identify current recurring payment financial transaction data in the current personal financial management and bill payment system user financial transaction data.

In accordance with one embodiment, when current recurring payment financial transaction data in the current personal financial management and bill payment system user financial transaction data is identified, the current recurring payment financial transaction data and the baseline recurring payment data in baseline recurring payment database are analyzed and/or compared to determine if the current recurring payment financial transaction data and the baseline recurring payment data in baseline recurring payment database match to a defined level of similarity.

In accordance with one embodiment, the current recurring payment financial transaction data and the baseline recurring payment data in baseline recurring payment database are analyzed and/or compared to determine if there is a defined level or range of similarity between the recurring payee data of the current recurring payment financial transaction data and the recurring payee data of the baseline recurring payment data.

In accordance with one embodiment, the current recurring payment financial transaction data and the baseline recurring payment data in baseline recurring payment database are analyzed and/or compared to determine if there is a defined level or range of similarity between the recurring product data of the current recurring payment financial transaction data and the recurring product data of the baseline recurring payment data.

In accordance with one embodiment, the current recurring payment financial transaction data and the baseline recurring payment data in baseline recurring payment database are analyzed and/or compared to determine if there is a defined level or range of similarity between the recurring service data of the current recurring payment financial transaction data and the recurring service data of the baseline recurring payment data.

In accordance with one embodiment, the current recurring payment financial transaction data and the baseline recurring payment data in baseline recurring payment database are analyzed and/or compared to determine if there is a defined level or range of similarity between the recurring payment amount data of the current recurring payment financial transaction data and the recurring payment amount data of the baseline recurring payment data.

In accordance with one embodiment, the current recurring payment financial transaction data and the baseline recurring payment data in baseline recurring payment database are analyzed and/or compared to determine if there is a defined level or range of similarity between the recurring payment frequency data of the current recurring payment financial transaction data and the recurring payment frequency data of the baseline recurring payment data.

In accordance with one embodiment, the current recurring payment financial transaction data and the baseline recurring payment data in baseline recurring payment database are analyzed and/or compared to determine if there is a defined level or range of similarity between the recurring payment date data of the current recurring payment financial transaction data and the recurring payment date data of the baseline recurring payment data.

In accordance with one embodiment, the current recurring payment financial transaction data and the baseline recurring payment data in baseline recurring payment database are analyzed and/or compared to determine if there is a defined level or range of similarity between the recurring payment day data of the current recurring payment financial transaction data and the recurring payment day data of the baseline recurring payment data.

In accordance with one embodiment, the current recurring payment financial transaction data and the baseline recurring payment data in baseline recurring payment database are analyzed and/or compared to determine if there is a defined level or range of similarity between any portion of the current recurring payment financial transaction data and the baseline recurring payment data.

In accordance with one embodiment, if the current recurring payment financial transaction data and the baseline recurring payment data do not match to a defined level of similarity, the current recurring payment financial transaction represented by the current recurring payment financial transaction data is then identified as a potentially fraudulent financial transaction.

In accordance with one embodiment, once a current recurring payment financial transaction represented by the current recurring payment financial transaction data is identified as a potentially fraudulent financial transaction, status data associated with the current recurring payment financial transaction data is transformed into potentially fraudulent payment financial transaction status data.

In accordance with one embodiment, the potentially fraudulent payment financial transaction data is then subjected to one or more protective actions including, but not limited to: preventing the payment represented by the potentially fraudulent payment financial transaction data from being completed; and/or forwarding the potentially fraudulent payment financial transaction data to a designated representative and/or agent of the user; and/or forwarding the potentially fraudulent payment financial transaction data to a designated representative of the personal financial management and bill payment system; and/or alerting the user of the potentially fraudulent payment financial transaction data and alerting one or more user designated representatives and/or agents of the user of the potentially fraudulent payment financial transaction data and forwarding the potentially fraudulent payment financial transaction data to a designated representative and/or agent of the user; and/or any other one or more protective actions as discussed herein, and/or as known in the art at the time of filing; and/or as developed after the time of filing.

In accordance with one embodiment, the potentially fraudulent payment financial transaction data is then subjected to one or more protective actions including, but not limited to, alerting the user of the potentially fraudulent payment financial transaction data and alerting one or more designated representatives and/or agents of the user of the potentially fraudulent payment financial transaction data and forwarding the potentially fraudulent payment financial transaction data to a designated representative and/or agent of the user.

FIG. 1 is a high level functionality-based block diagram of a hardware and production environment 100 for identifying potentially fraudulent bill and invoice payments, in accordance with one embodiment.

As seen in FIG. 1, in this specific illustrative example, production environment 100 includes: financial transaction data sources 121A through 121N; personal financial management and bill payment system computing system environment 110, including personal financial management and bill payment system 111; and process computing system environment 130, including process computing system 131.

As seen in FIG. 1, in this specific illustrative example, personal financial management and bill payment system 111 includes personal financial management and bill payment system user financial transaction data 113 collected, in one embodiment, from two or more of financial transaction data sources 121A through 121N.

As seen in FIG. 1, in this specific illustrative example, process computing system 131 includes a financial transaction data access module 133 for obtaining access to personal financial management and bill payment system user financial transaction data 135 representing financial transactions associated with users of personal financial management and bill payment system 111. In one embodiment, the personal financial management and bill payment system user financial transaction data 135 includes financial transaction data from two or more sources of financial transaction data, such as financial transaction data sources 121A through 121N.

As seen in FIG. 1, in this specific illustrative example, process computing system 131 includes a recurring payment identification module 137 for analyzing the personal financial management and bill payment system user financial transaction data 135 associated with a user to identify recurring payment financial transaction data 139 representing recurring payments made by the user.

As seen in FIG. 1, in this specific illustrative example, process computing system 131 includes a baseline recurring payment data generation module 141 for analyzing recurring payment financial transaction data 139 for each identified recurring payment financial transaction associated with the user to determine baseline recurring payment data 143 associated with each recurring payment financial transaction.

As seen in FIG. 1, in this specific illustrative example, process computing system 131 includes a correlation module 145 for correlating recurring payment financial transaction data 139 and baseline recurring payment data 143 associated with recurring payment financial transaction data 139.

As seen in FIG. 1, in this specific illustrative example, process computing system 131 includes a baseline recurring payment database 147 for storing the correlated recurring payment financial transaction data 139 and the baseline recurring payment data 143 associated with each recurring payment financial transaction.

As seen in FIG. 1, in this specific illustrative example, process computing system 131 includes a monitoring module 149 for monitoring current personal financial management and bill payment system user financial transaction data representing current financial transactions associated with the user of personal financial management and bill payment system 111

As seen in FIG. 1, in this specific illustrative example, process computing system 131 includes a current recurring payment financial transaction data identification module 151 for analyzing current personal financial management and bill payment system user financial transaction data to identify current recurring payment financial transaction data 153 in the current personal financial management and bill payment system user financial transaction data.

As seen in FIG. 1, in this specific illustrative example, process computing system 131 includes a comparison module 155 for analyzing and comparing current recurring payment financial transaction data 153 and baseline recurring payment data 143 in baseline recurring payment database 147.

As seen in FIG. 1, in this specific illustrative example, process computing system 131 includes a status determination module 157 for designating a current recurring payment financial transaction represented by the current recurring payment financial transaction data as a potentially fraudulent financial transaction and changing status data associated with current recurring payment financial transaction data 153 to potentially fraudulent payment financial transaction data if the current recurring payment financial transaction data 153 and the baseline recurring payment data 143 do not match to a defined level of similarity.

As seen in FIG. 1, in this specific illustrative example, process computing system 131 includes a protective action implementation module 159 for performing one or more protective actions on the potentially fraudulent payment financial transaction data.

The embodiments disclosed herein provide a method and system for identifying financial transaction data representing potentially fraudulent bill and invoice payments and then automatically taking appropriate action to minimize the adverse effects or any potentially fraudulent bill and invoice payments to be made, or made, through a personal financial management and bill payment system. Therefore, disclosed herein is an efficient, effective, and dynamically adaptable technical solution to the long standing technical problem in the financial management system, payment processing, and invoicing arts of detecting fraudulent bill and invoice payment activity conducted through any one of multiple sources of financial transaction data associated with a consumer in an integrated and holistic manner.

However, the disclosed method and system for identifying potentially fraudulent bill and invoice payments does not encompass, embody, or preclude other forms of innovation in the area of fraud detection and/or financial transaction bill payment processing and invoicing. In addition, the disclosed method and system for identifying potentially fraudulent bill and invoice payments is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments, and the management and processing of large amounts of data, i.e., "big data." Consequently, the disclosed method and system for identifying potentially fraudulent bill and invoice payments is not directed to, does not encompass, and is not merely, an abstract idea or concept.

In addition, the disclosed method and system for identifying potentially fraudulent bill and invoice payments provides for significant improvements to the technical fields of fraud detection, senior citizen/consumer protection, electronic transaction data processing, invoicing, financial transaction categorization, information dissemination, data processing, data management, data filtering and mining, automatic electronic bill payment, and user experience.

In addition, the disclosed method and system for identifying potentially fraudulent bill and invoice payments provides for the entry, processing, and dissemination, of only potentially legitimate portions of data; thereby eliminating unnecessary data analysis and correction before resources are allocated to processing, and/or correcting, fraudulent financial transaction data, and/or the, fraudulent financial transaction data is further transmitted/distributed. Consequently, using the disclosed method and system for identifying potentially fraudulent bill and invoice payments results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing the method and system for identifying potentially fraudulent bill and invoice payments.

Process

In accordance with one embodiment, financial transaction data representing financial transactions associated with a user is obtained from two or more sources through a personal financial management and bill payment system. In one embodiment, the financial transaction data is then analyzed to identify recurring payments to the same payees, and/or for the same products or services, indicated in the financial transaction data associated with the user. In one embodiment, recurring payment data representing recurring payments to the same payees, and/or for the same products or services, indicated in the financial transaction data associated with the user is then analyzed to generate baseline bill payment and/or invoice data for the payees, and/or for the same products or services. In one embodiment, the baseline bill payment and/or invoice data includes data indicating the frequency, amount, payee, and/or product or service, associated with recurring bills and/or invoices paid by the user.

In one embodiment, financial transaction data associated with the user is then monitored and compared with the baseline bill payment and/or invoice data. In one embodiment, if a bill and/or invoice payment is identified for a payee, and/or for a service or product, that is outside a defined range of the baseline amount or frequency associated with that payee, and/or for that service or product, the bill and/or invoice payment is identified and processed as a potentially fraudulent financial transaction and appropriate protection measures are taken.

Consequently, disclosed herein is a method and system for automatically detecting potentially fraudulent bill and invoice payment activity conducted through any one of multiple sources of financial transaction data associated with a user. Therefore, disclosed herein is an efficient, effective, and dynamically adaptable technical solution to the long standing technical problem in the bill and invoice payment system arts of providing a user friendly, simple to implement, and highly accurate way to detect fraudulent bill and invoice payment activity that monitors and processes financial transaction data from multiple sources of financial transaction data associated with a consumer in an integrated and holistic manner.

Figure 2:
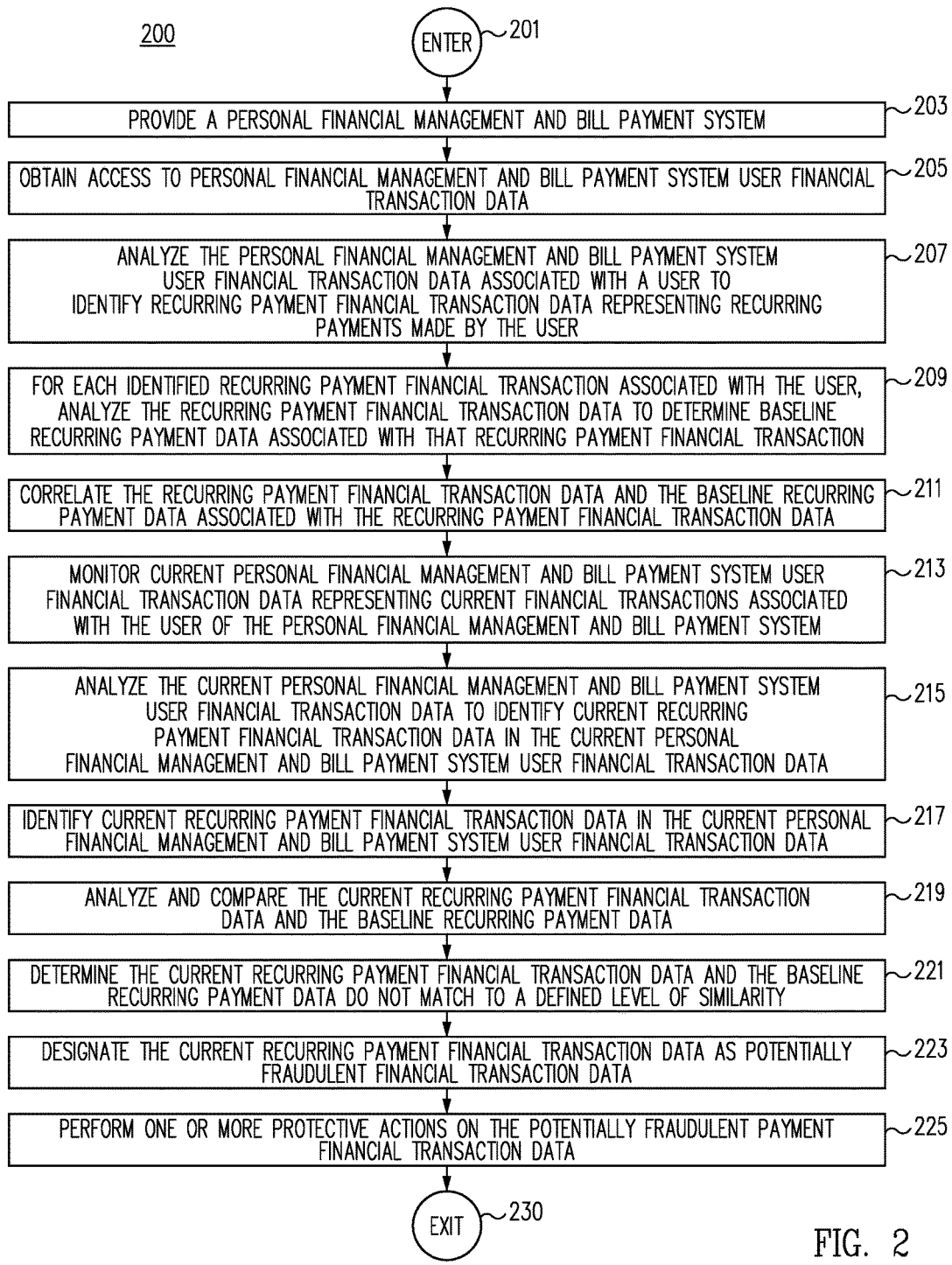
FIG. 2 is a flow chart representing one example of a generalized process for identifying potentially fraudulent bill and invoice payments, in accordance with one embodiment.

FIG. 2 is a flow chart representing one example of a process 200 for identifying potentially fraudulent bill and invoice payments in accordance with one embodiment.

As seen in FIG. 2, process 200 for identifying potentially fraudulent bill and invoice payments begins at ENTER OPERATION 201 and process flow proceeds to PROVIDE A PERSONAL FINANCIAL MANAGEMENT AND BILL PAYMENT SYSTEM OPERATION 203.

In one embodiment, at PROVIDE A PERSONAL FINANCIAL MANAGEMENT AND BILL PAYMENT SYSTEM OPERATION 203, a personal financial management and bill payment system is provided using one or more computing systems.

In accordance with one embodiment, the personal financial management and bill payment system of PROVIDE A PERSONAL FINANCIAL MANAGEMENT AND BILL PAYMENT SYSTEM OPERATION 203 is provided to users of the personal financial management and bill payment system.

As noted above, herein, the term "personal financial management and bill payment system" includes, but is not limited to, the following: computing system, desktop system, mobile system, and/or wearable device implemented, and/or online, and/or web-based, storage based, persistence based, personal financial transaction aggregation and/or processing systems, services, packages, programs, modules, or applications; computing system, desktop system, mobile system, and/or wearable device implemented, and/or online, and/or web-based, storage based, persistence based, personal financial management and budgeting systems, services, packages, programs, modules, or applications; computing system, desktop system, mobile system, and/or wearable device implemented, and/or online, and/or web-based, storage based, persistence based, personal data management systems, services, packages, programs, modules, or applications; computing system, desktop system, mobile system, and/or wearable device implemented, and/or online, and/or web-based, storage based, persistence based, personal accounting systems, services, packages, programs, modules, or applications; personal electronic tax preparation systems, services, packages, programs, modules, or applications; and various other personal electronic data management systems, services, packages, programs, modules, or applications, whether known at the time of filing, or as developed later.

As noted above, specific examples of personal financial management and bill payment systems include, but are not limited to the following: Mint™, available from Intuit, Inc. of Mountain View, Calif.; Mint Online™, available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

In accordance with one embodiment, the personal financial management and bill payment system is a financial transaction management and bill payment system through which a user of the financial transaction management and bill payment system is provided the capability to categorize financial transactions and pay the customer user's bills.

In one embodiment, once a personal financial management and bill payment system is provided using one or more computing systems at PROVIDE A PERSONAL FINANCIAL MANAGEMENT AND BILL PAYMENT SYSTEM OPERATION 203, process flow proceeds to OBTAIN ACCESS TO PERSONAL FINANCIAL MANAGEMENT AND BILL PAYMENT SYSTEM USER FINANCIAL TRANSACTION DATA OPERATION 205.

In one embodiment, at OBTAIN ACCESS TO PERSONAL FINANCIAL MANAGEMENT AND BILL PAYMENT SYSTEM USER FINANCIAL TRANSACTION DATA OPERATION 205, one or more processors associated with one or more computing systems are utilized to obtain access to personal financial management and bill payment system user financial transaction data representing financial transactions associated with users of the personal financial management and bill payment system of PROVIDE A PERSONAL FINANCIAL MANAGEMENT AND BILL PAYMENT SYSTEM OPERATION 203.

As noted above, herein, the term "financial transaction" includes, but is not limited to, any interaction between two or more parties involving the transfer, or re-categorization, of funds between the parties. Herein, the term "financial transaction data" includes, but is not limited to, electronic data representing at least one financial transaction and that is capable of being processed by a processor, and/or stored in a memory, and/or is otherwise machine readable.

In accordance with one embodiment, at OBTAIN ACCESS TO PERSONAL FINANCIAL MANAGEMENT AND BILL PAYMENT SYSTEM USER FINANCIAL TRANSACTION DATA OPERATION 205 one or more processors associated with one or more computing systems are utilized to obtain access to personal financial management and bill payment system user financial transaction data associated with users of the personal financial management and bill payment system by obtaining access to user account data associated with the users of the personal financial management and bill payment system.

In various embodiments, the personal financial management and bill payment system user financial transaction data of OBTAIN ACCESS TO PERSONAL FINANCIAL MANAGEMENT AND BILL PAYMENT SYSTEM USER FINANCIAL TRANSACTION DATA OPERATION 205 includes, but is not limited to, data representing payments made to a payee party on behalf of the user of the personal financial management and bill payment system through the personal financial management and bill payment system, and/or through any account offered by any financial institution or payment system provider.

In one embodiment, the personal financial management and bill payment system user financial transaction data of OBTAIN ACCESS TO PERSONAL FINANCIAL MANAGEMENT AND BILL PAYMENT SYSTEM USER FINANCIAL TRANSACTION DATA OPERATION 205 includes, but is not limited to, one or more of: payee data indicating a payee associated with payments identified in the financial transaction data; product data indicating a product associated with payments identified in the payment financial transaction data; service data indicating a service associated with payments identified in the payment financial transaction data; amount data indicating a payment amount associated with payments identified in the financial transaction data; payment date data indicating a payment date associated with payments identified in the financial transaction data; and/or any one or more types of personal financial management and bill payment system user financial transaction data, as discussed herein, and/or as known in the art at the time of filing, and/or as developed after the time of filing.

In one embodiment, the personal financial management and bill payment system user financial transaction data of OBTAIN ACCESS TO PERSONAL FINANCIAL MANAGEMENT AND BILL PAYMENT SYSTEM USER FINANCIAL TRANSACTION DATA OPERATION 205 is verified using one or more verification mechanisms and/or processes as discussed herein, and/or as known in the art at the time of filing, and/or as developed or becomes known after the time of filing.

In one embodiment, the personal financial management and bill payment system user financial transaction data obtained at OBTAIN ACCESS TO PERSONAL FINANCIAL MANAGEMENT AND BILL PAYMENT SYSTEM USER FINANCIAL TRANSACTION DATA OPERATION 205 is stored in a partitioned personal financial management and bill payment system user financial transaction data section of a memory.

In one embodiment, once one or more processors associated with one or more computing systems are utilized to obtain access to personal financial management and bill payment system user financial transaction data representing financial transactions associated with users of the personal financial management and bill payment system at OBTAIN ACCESS TO PERSONAL FINANCIAL MANAGEMENT AND BILL PAYMENT SYSTEM USER FINANCIAL TRANSACTION DATA OPERATION 205, process flow proceeds to ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207.

In one embodiment, at ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207, one or more processors associated with one or more computing systems are used to analyze the personal financial management and bill payment system user financial transaction data associated with a given user and to identify recurring payment financial transaction data representing recurring payments made by the user.

In accordance with one embodiment, at ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 one or more processors associated with one or more computing systems are used to analyze the personal financial management and bill payment system user financial transaction data associated with a given user to identify user payee data included in the financial transaction data associated with the user. In one embodiment, the user payee data represents one or more payees associated with the user financial transactions represented by the portion of the user financial transaction data associated with the user.

In one embodiment, the user payee data is verified using one or more verification mechanisms and/or processes as discussed herein, and/or as known in the art at the time of filing, and/or as developed or becomes known after the time of filing.

In accordance with one embodiment, at ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 one or more processors associated with one or more computing systems are used to analyze the personal financial management and bill payment system user financial transaction data associated with a given user to identify user product data indicating a product associated with payments identified in the payment financial transaction data associated with the user.

In one embodiment, the user product data represents one or more products associated with the user financial transactions represented by the portion of the user financial transaction data associated with the user.

In one embodiment, the user product data is verified using one or more verification mechanisms and/or processes as discussed herein, and/or as known in the art at the time of filing, and/or as developed or becomes known after the time of filing.

In one embodiment, the user product data is stored in a partitioned user product data section of a memory.

In accordance with one embodiment, at ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 one or more processors associated with one or more computing systems are used to analyze the personal financial management and bill payment system user financial transaction data associated with a given user to identify user service data indicating a service associated with payments identified in the payment financial transaction data associated with the user.

In one embodiment, the user service data represents one or more services associated with the user financial transactions represented by the portion of the user financial transaction data associated with the user.

In one embodiment, the user service data is verified using one or more verification mechanisms and/or processes as discussed herein, and/or as known in the art at the time of filing, and/or as developed or becomes known after the time of filing.

In one embodiment, the user service data is stored in a partitioned user service data section of a memory.

In accordance with one embodiment, at ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 one or more processors associated with one or more computing systems are used to analyze the personal financial management and bill payment system user financial transaction data associated with a given user to identify user payment date data indicating a payment date associated with payments identified in the payment financial transaction data associated with the user.

In one embodiment, the user payment date data represents one or more payment dates associated with the user financial transactions represented by the portion of the user financial transaction data associated with the user.

In one embodiment, the user payment date data is verified using one or more verification mechanisms and/or processes as discussed herein, and/or as known in the art at the time of filing, and/or as developed or becomes known after the time of filing.

In one embodiment, the user payment date data is stored in a partitioned user payment date data section of a memory.

In accordance with one embodiment, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, recurring payee data indicating a payee associated with recurring payments identified in the recurring payment financial transaction data.

In accordance with one embodiment, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, recurring product data indicating a product associated with recurring payments identified in the recurring payment financial transaction data.

In accordance with one embodiment, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, recurring service data indicating a service associated with recurring payments identified in the recurring payment financial transaction data.

In accordance with one embodiment, the recurring payment financial transaction data of ANALYZE THE PER- SONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, recurring payment amount data indicating a payment amount associated with recurring payments identified in the recurring payment financial transaction data.

In accordance with one embodiment, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, recurring payment frequency data indicating a frequency of payment associated with recurring payments identified in the recurring payment financial transaction data.

In accordance with one embodiment, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, recurring payment date data indicating a date associated with recurring payments identified in the recurring payment financial transaction data.

In accordance with one embodiment, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, recurring payment day data indicating a day associated with recurring payments identified in the recurring payment financial transaction data.

In accordance with one embodiment, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 includes, but is not limited to, any one or more types of recurring payment financial transaction data, as discussed herein, and/or as known in the art at the time of filing, and/or as developed after the time of filing.

In one embodiment, once one or more processors associated with one or more computing systems are used to analyze the personal financial management and bill payment system user financial transaction data associated with a given user and to identify recurring payment financial transaction data representing recurring payments made by the user at ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207, process flow proceeds to FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209.

In one embodiment, at FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209, for each identified recurring payment financial transaction associated with the user of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207, the recurring payment financial transaction data is further analyzed to determine baseline recurring payment data associated with that recurring payment financial transaction.

In accordance with one embodiment, baseline recurring payment data associated with a recurring payment financial transaction of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, recurring payee data indicating a payee associated with recurring payments identified in the recurring payment financial transaction data.

In accordance with one embodiment, baseline recurring payment data associated with recurring payment financial transaction of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, recurring product data indicating a product associated with recurring payments identified in the recurring payment financial transaction data.

In accordance with one embodiment, baseline recurring payment data associated with a recurring payment financial transaction of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, recurring service data indicating a service associated with recurring payments identified in the recurring payment financial transaction data.

In accordance with one embodiment, baseline recurring payment data associated with a recurring payment financial transaction of FOR EACH IDENTIFIED RECURRING PAYMENT FINANCIAL TRANSACTION ASSOCIATED WITH THE USER, ANALYZE THE RECURRING PAY- MENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, recurring payment amount data indicating a payment amount associated with recurring payments identified in the recurring payment financial transaction data.

In accordance with one embodiment, baseline recurring payment data associated with a recurring payment financial transaction of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, recurring payment frequency data indicating a frequency of payment associated with recurring payments identified in the recurring payment financial transaction data.

In accordance with one embodiment, baseline recurring payment data associated with a recurring payment financial transaction of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, recurring payment date data indicating a date associated with recurring payments identified in the recurring payment financial transaction data In accordance with one embodiment, baseline recurring payment data associated with a recurring payment financial transaction of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, recurring payment day data indicating a day associated with recurring payments identified in the recurring payment financial transaction data.

In accordance with one embodiment, baseline recurring payment data associated with a recurring payment financial transaction of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 includes, but is not limited to, any baseline recurring payment data associated with a recurring payment financial transaction as discussed herein, and/or as known in the art at the time of filing, and/or as developed after the time of filing.

In one embodiment, once the recurring payment financial transaction data is further analyzed to determine baseline recurring payment data associated with a recurring payment financial transaction at FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209, process flow proceeds to CORRELATE THE RECURRING PAYMENT FINANCIAL TRANSACTION DATA AND THE BASELINE RECURRING PAYMENT DATA ASSOCIATED WITH THE RECURRING PAYMENT FINANCIAL TRANSACTION DATA OPERATION 211.

In one embodiment, at CORRELATE THE RECURRING PAYMENT FINANCIAL TRANSACTION DATA AND THE BASELINE RECURRING PAYMENT DATA ASSOCIATED WITH THE RECURRING PAYMENT FINANCIAL TRANSACTION DATA OPERATION 211, the recurring payment financial transaction data of ANALYZE THE PERSONAL FINANCIAL MANAGEMENT AND BILL PAYMENT SYSTEM USER FINANCIAL TRANSACTION DATA ASSOCIATED WITH A USER TO IDENTIFY RECURRING PAYMENT FINANCIAL TRANSACTION DATA REPRESENTING RECURRING PAYMENTS MADE BY THE USER OPERATION 207 and the baseline recurring payment data associated with the recurring payment financial transaction data of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 are correlated and the correlated recurring payment financial transaction data and the baseline recurring payment data associated with the recurring payment financial transaction data is then stored in a baseline recurring payment database.

In one embodiment, once the recurring payment financial transaction data and the baseline recurring payment data associated with the recurring payment financial transaction data are correlated and the correlated recurring payment financial transaction data and the baseline recurring payment data associated with the recurring payment financial transaction data is then stored in a baseline recurring payment database at CORRELATE THE RECURRING PAYMENT FINANCIAL TRANSACTION DATA AND THE BASELINE RECURRING PAYMENT DATA ASSOCIATED WITH THE RECURRING PAYMENT FINANCIAL TRANSACTION DATA OPERATION 211, process flow proceeds to MONITOR CURRENT PERSONAL FINANCIAL MANAGEMENT AND BILL PAYMENT SYSTEM USER FINANCIAL TRANSACTION DATA REPRESENTING CURRENT FINANCIAL TRANSACTIONS ASSOCIATED WITH THE USER OF THE PERSONAL FINANCIAL MANAGEMENT AND BILL PAYMENT SYSTEM OPERATION 213.

In one embodiment, at MONITOR CURRENT PERSONAL FINANCIAL MANAGEMENT AND BILL PAYMENT SYSTEM USER FINANCIAL TRANSACTION DATA REPRESENTING CURRENT FINANCIAL TRANSACTIONS ASSOCIATED WITH THE USER OF THE PERSONAL FINANCIAL MANAGEMENT AND BILL PAYMENT SYSTEM OPERATION 213, current personal financial management and bill payment system user financial transaction data representing current financial transactions associated with the user of the personal financial management and bill payment system of PROVIDE A PERSONAL FINANCIAL MANAGEMENT AND BILL PAYMENT SYSTEM OPERATION 203 is obtained and/or monitored.

In one embodiment, once current personal financial management and bill payment system user financial transaction data representing current financial transactions associated with the user of the personal financial management and bill payment system is obtained and/or monitored at MONITOR CURRENT PERSONAL FINANCIAL MANAGEMENT AND BILL PAYMENT SYSTEM USER FINANCIAL TRANSACTION DATA REPRESENTING CURRENT FINANCIAL TRANSACTIONS ASSOCIATED WITH THE USER OF THE PERSONAL FINANCIAL MANAGEMENT AND BILL PAYMENT SYSTEM OPERATION 213, process flow proceeds to ANALYZE THE CURRENT PERSONAL FINANCIAL MANAGEMENT AND BILL PAYMENT SYSTEM USER FINANCIAL TRANSACTION DATA TO IDENTIFY CURRENT RECURRING PAYMENT FINANCIAL TRANSACTION DATA IN THE CURRENT PERSONAL FINANCIAL MANAGEMENT AND BILL PAYMENT SYSTEM USER FINANCIAL TRANSACTION DATA OPERATION 215.

In one embodiment, at ANALYZE THE CURRENT PERSONAL FINANCIAL MANAGEMENT AND BILL PAYMENT SYSTEM USER FINANCIAL TRANSACTION DATA TO IDENTIFY CURRENT RECURRING PAYMENT FINANCIAL TRANSACTION DATA IN THE CURRENT PERSONAL FINANCIAL MANAGEMENT AND BILL PAYMENT SYSTEM USER FINANCIAL TRANSACTION DATA OPERATION 215, the current personal financial management and bill payment system user financial transaction data of MONITOR CURRENT PERSONAL FINANCIAL MANAGEMENT AND BILL PAYMENT SYSTEM USER FINANCIAL TRANSACTION DATA REPRESENTING CURRENT FINANCIAL TRANSACTIONS ASSOCIATED WITH THE USER OF THE PERSONAL FINANCIAL MANAGEMENT AND BILL PAYMENT SYSTEM OPERATION 213 is analyzed to identify current recurring payment financial transaction data in the current personal financial management and bill payment system user financial transaction data.

In one embodiment, once the current personal financial management and bill payment system user financial transaction data is analyzed to identify current recurring payment financial transaction data in the current personal financial management and bill payment system user financial transaction data at ANALYZE THE CURRENT PERSONAL FINANCIAL MANAGEMENT AND BILL PAYMENT SYSTEM USER FINANCIAL TRANSACTION DATA TO IDENTIFY CURRENT RECURRING PAYMENT FINANCIAL TRANSACTION DATA IN THE CURRENT PERSONAL FINANCIAL MANAGEMENT AND BILL PAYMENT SYSTEM USER FINANCIAL TRANSACTION DATA OPERATION 215, process flow proceeds to IDENTIFY CURRENT RECURRING PAYMENT FINANCIAL TRANSACTION DATA IN THE CURRENT PERSONAL FINANCIAL MANAGEMENT AND BILL PAYMENT SYSTEM USER FINANCIAL TRANSACTION DATA OPERATION 217.

In one embodiment, at IDENTIFY CURRENT RECURRING PAYMENT FINANCIAL TRANSACTION DATA IN THE CURRENT PERSONAL FINANCIAL MANAGEMENT AND BILL PAYMENT SYSTEM USER FINANCIAL TRANSACTION DATA OPERATION 217, current recurring payment financial transaction data is identified in the current personal financial management and bill payment system user financial transaction data of MONITOR CURRENT PERSONAL FINANCIAL MANAGEMENT AND BILL PAYMENT SYSTEM USER FINANCIAL TRANSACTION DATA REPRESENTING CURRENT FINANCIAL TRANSACTIONS ASSOCIATED WITH THE USER OF THE PERSONAL FINANCIAL MANAGEMENT AND BILL PAYMENT SYSTEM OPERATION 213.

In one embodiment, once current recurring payment financial transaction data is identified in the current personal financial management and bill payment system user financial transaction data at IDENTIFY CURRENT RECURRING PAYMENT FINANCIAL TRANSACTION DATA IN THE CURRENT PERSONAL FINANCIAL MANAGEMENT AND BILL PAYMENT SYSTEM USER FINANCIAL TRANSACTION DATA OPERATION 217, process flow proceeds to ANALYZE AND COMPARE THE CURRENT RECURRING PAYMENT FINANCIAL TRANSACTION DATA AND THE BASELINE RECURRING PAYMENT DATA OPERATION 219.

In one embodiment, at ANALYZE AND COMPARE THE CURRENT RECURRING PAYMENT FINANCIAL TRANSACTION DATA AND THE BASELINE RECURRING PAYMENT DATA OPERATION 219, the current recurring payment financial transaction data of IDENTIFY CURRENT RECURRING PAYMENT FINANCIAL TRANSACTION DATA IN THE CURRENT PERSONAL FINANCIAL MANAGEMENT AND BILL PAYMENT SYSTEM USER FINANCIAL TRANSACTION DATA OPERATION 217 and the baseline recurring payment data of FOR EACH IDENTIFIED RECURRING PAYMENT FINANCIAL TRANSACTION ASSOCIATED WITH THE USER, ANALYZE THE RECURRING PAYMENT FINANCIAL TRANSACTION DATA TO DETERMINE BASELINE RECURRING PAYMENT DATA ASSOCIATED WITH THAT RECURRING PAYMENT FINANCIAL TRANSACTION OPERATION 209 in baseline recurring payment database of CORRELATE THE RECURRING PAYMENT FINANCIAL TRANSACTION DATA AND THE BASELINE RECURRING PAYMENT DATA ASSOCIATED WITH THE RECURRING PAYMENT FINANCIAL TRANSACTION DATA OPERATION 211 are analyzed and/or compared to determine if the current recurring payment financial transaction data and the baseline recurring payment data in baseline recurring payment database match to a defined level of similarity.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between the recurring payee data of the current recurring payment financial transaction data and the recurring payee data of the baseline recurring payment data.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between the recurring product data of the current recurring payment financial transaction data and the recurring product data of the baseline recurring payment data.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between the recurring service data of the current recurring payment financial transaction data and the recurring service data of the baseline recurring payment data.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between the recurring payment amount data of the current recurring payment financial transaction data and the recurring payment amount data of the baseline recurring payment data.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between the recurring payment frequency data of the current recurring payment financial transaction data and the recurring payment frequency data of the baseline recurring payment data.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between the recurring payment date data of the current recurring payment financial transaction data and the recurring payment date data of the baseline recurring payment data.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between the recurring payment day data of the current recurring payment financial transaction data and the recurring payment day data of the baseline recurring payment data.

In accordance with one embodiment, at ANALYZE AND COMPARE THE CURRENT RECURRING PAYMENT FINANCIAL TRANSACTION DATA AND THE BASELINE RECURRING PAYMENT DATA OPERATION 219 the current recurring payment financial transaction data and the baseline recurring payment data in baseline recurring payment database are analyzed and/or compared to determine if there is a defined level or range of similarity between any portion of the current recurring payment financial transaction data and the baseline recurring payment data.

In accordance with one embodiment, if the current recurring payment financial transaction data and the baseline recurring payment data do not match to a defined level of similarity at ANALYZE AND COMPARE THE CURRENT RECURRING PAYMENT FINANCIAL TRANSACTION DATA AND THE BASELINE RECURRING PAYMENT DATA OPERATION 219, process flow proceeds to DETERMINE THE CURRENT RECURRING PAYMENT FINANCIAL TRANSACTION DATA AND THE BASELINE RECURRING PAYMENT DATA DO NOT MATCH TO A DEFINED LEVEL OF SIMILARITY OPERATION 221.

In one embodiment, at DETERMINE THE CURRENT RECURRING PAYMENT FINANCIAL TRANSACTION DATA AND THE BASELINE RECURRING PAYMENT DATA DO NOT MATCH TO A DEFINED LEVEL OF SIMILARITY OPERATION 221, the current recurring payment financial transaction data and the baseline recurring payment data are determined not to match to a defined level of similarity at ANALYZE AND COMPARE THE CURRENT RECURRING PAYMENT FINANCIAL TRANSACTION DATA AND THE BASELINE RECURRING PAYMENT DATA OPERATION 219.

In one embodiment, once the current recurring payment financial transaction data and the baseline recurring payment data are determined not to match to a defined level of similarity at ANALYZE AND COMPARE THE CURRENT RECURRING PAYMENT FINANCIAL TRANSACTION DATA AND THE BASELINE RECURRING PAYMENT DATA OPERATION 219 at DETERMINE THE CURRENT RECURRING PAYMENT FINANCIAL TRANSACTION DATA AND THE BASELINE RECURRING PAYMENT DATA DO NOT MATCH TO A DEFINED LEVEL OF SIMILARITY OPERATION 221, process flow proceeds to DESIGNATE THE CURRENT RECURRING PAYMENT FINANCIAL TRANSACTION DATA AS POTENTIALLY FRAUDULENT FINANCIAL TRANSACTION DATA OPERATION 223.

In one embodiment, at DESIGNATE THE CURRENT RECURRING PAYMENT FINANCIAL TRANSACTION DATA AS POTENTIALLY FRAUDULENT FINANCIAL TRANSACTION DATA OPERATION 223, the current recurring payment financial transaction represented by the current recurring payment financial transaction data of DETERMINE THE CURRENT RECURRING PAYMENT FINANCIAL TRANSACTION DATA AND THE BASELINE RECURRING PAYMENT DATA DO NOT MATCH TO A DEFINED LEVEL OF SIMILARITY OPERATION 221 is identified as a potentially fraudulent financial transaction.

In one embodiment, at DESIGNATE THE CURRENT RECURRING PAYMENT FINANCIAL TRANSACTION DATA AS POTENTIALLY FRAUDULENT FINANCIAL TRANSACTION DATA OPERATION 223, once a current recurring payment financial transaction represented by the current recurring payment financial transaction data is identified as a potentially fraudulent financial transaction, status data associated with the current recurring payment financial transaction data is transformed into potentially fraudulent payment financial transaction status data.

In one embodiment, once the current recurring payment financial transaction represented by the current recurring payment financial transaction data is identified as a potentially fraudulent financial transaction at DESIGNATE THE CURRENT RECURRING PAYMENT FINANCIAL TRANSACTION DATA AS POTENTIALLY FRAUDULENT FINANCIAL TRANSACTION DATA OPERATION 223, process flow proceeds to PERFORM ONE OR MORE PROTECTIVE ACTIONS ON THE POTENTIALLY FRAUDULENT PAYMENT FINANCIAL TRANSACTION DATA OPERATION 225.

In one embodiment, at PERFORM ONE OR MORE PROTECTIVE ACTIONS ON THE POTENTIALLY

FRAUDULENT PAYMENT FINANCIAL TRANSACTION DATA OPERATION 225, the potentially fraudulent payment financial transaction data of DESIGNATE THE CURRENT RECURRING PAYMENT FINANCIAL TRANSACTION DATA AS POTENTIALLY FRAUDULENT FINANCIAL TRANSACTION DATA OPERATION 223 is subjected to one or more protective actions.

In accordance with one embodiment, at PERFORM ONE OR MORE PROTECTIVE ACTIONS ON THE POTENTIALLY FRAUDULENT PAYMENT FINANCIAL TRANSACTION DATA OPERATION 225, the potentially fraudulent payment financial transaction data is then subjected to one or more protective actions including, but not limited to: preventing the payment represented by the potentially fraudulent payment financial transaction data from being completed; and/or forwarding the potentially fraudulent payment financial transaction data to a designated representative and/or agent of the user; and/or forwarding the potentially fraudulent payment financial transaction data to a designated representative of the personal financial management and bill payment system; and/or alerting the user of the potentially fraudulent payment financial transaction data and alerting one or more user designated representatives and/or agents of the user of the potentially fraudulent payment financial transaction data and forwarding the potentially fraudulent payment financial transaction data to a designated representative and/or agent of the user; and/or any other one or more protective actions as discussed herein, and/or as known in the art at the time of filing; and/or as developed after the time of filing.

In one embodiment, once the potentially fraudulent payment financial transaction data of DESIGNATE THE CURRENT RECURRING PAYMENT FINANCIAL TRANSACTION DATA AS POTENTIALLY FRAUDULENT FINANCIAL TRANSACTION DATA OPERATION 223 is subjected to one or more protective actions at PERFORM ONE OR MORE PROTECTIVE ACTIONS ON THE POTENTIALLY FRAUDULENT PAYMENT FINANCIAL TRANSACTION DATA OPERATION 225, process flow proceeds to EXIT OPERATION 230.

In one embodiment, at EXIT OPERATION 230, process 200 for identifying potentially fraudulent bill and invoice payments is exited to await new data.

The disclosed embodiments of process 200 for identifying potentially fraudulent bill and invoice payments provide for the automatic identification of financial transaction data representing potentially fraudulent bill and invoice payments and then automatically taking appropriate action to minimize the adverse effects or any potentially fraudulent bill and invoice payments to be made, or made, through a personal financial management and bill payment system. Therefore, disclosed herein is an efficient, effective, and dynamically adaptable technical solution to the long standing technical problem in the financial management system, payment processing, and invoicing arts of detecting fraudulent bill and invoice payment activity conducted through any one of multiple sources of financial transaction data associated with a consumer in an integrated and holistic manner.

However, the disclosed process 200 for identifying potentially fraudulent bill and invoice payments does not encompass, embody, or preclude other forms of innovation in the area of fraud detection and/or financial transaction bill payment processing and invoicing. In addition, the disclosed process 200 for identifying potentially fraudulent bill and invoice payments is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments, and the management and processing of large amounts of data, i.e., "big data." Consequently, the disclosed process 200 for identifying potentially fraudulent bill and invoice payments is not directed to, does not encompass, and is not merely, an abstract idea or concept.

In addition, the process 200 for identifying potentially fraudulent bill and invoice payments provides for significant improvements to the technical fields of fraud detection, senior citizen/consumer protection, electronic transaction data processing, invoicing, financial transaction categorization, information dissemination, data processing, data management, data filtering and mining, automatic electronic bill payment, and user experience.

In addition, the disclosed process 200 for identifying potentially fraudulent bill and invoice payments provides for the entry, processing, and dissemination, of only potentially legitimate portions of data; thereby eliminating unnecessary data analysis and correction before resources are allocated to processing, and/or correcting, fraudulent financial transaction data, and/or the, fraudulent financial transaction data is further transmitted/distributed. Consequently, using the disclosed process 200 for identifying potentially fraudulent bill and invoice payments results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing process 200 for identifying potentially fraudulent bill and invoice payments.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the mechanism and/or process used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring," "determining," "defining," "designating," "obtaining," "accessing," "analyzing," "obtaining," "identifying," "designating," categorizing," "correlating," "receiving," "transmitting," "implementing," "associating," "aggregating," "initiating," "collecting," "creating," "transferring," "storing," "searching," "comparing," "providing," "performing," "transforming," "incorporating." "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for identifying potentially fraudulent bill and invoice payments, the method comprising:

providing a personal financial management and bill payment system;

obtaining access to personal financial management and bill payment system user financial transaction data representing financial transactions associated with users of the personal financial management and bill payment system, the personal financial management and bill payment system user financial transaction data including financial transaction data from two or more sources of financial transaction data;

analyzing the personal financial management and bill payment system user financial transaction data associated with a user to identify recurring payment financial transaction data representing recurring payments made by the user;

for each identified recurring payment financial transaction associated with the user, analyzing the recurring payment financial transaction data to determine baseline recurring payment data associated with that recurring payment financial transaction;

correlating the recurring payment financial transaction data and the baseline recurring payment data associated with the recurring payment financial transaction data;

storing the correlated recurring payment financial transaction data and the baseline recurring payment data associated with the recurring payment financial transaction data in a baseline recurring payment database;

monitoring current personal financial management and bill payment system user financial transaction data representing current financial transactions associated with the user of the personal financial management and bill payment system;

analyzing current personal financial management and bill payment system user financial transaction data to identify current recurring payment financial transaction data in the current personal financial management and bill payment system user financial transaction data;

identifying current recurring payment financial transaction data in the current personal financial management and bill payment system user financial transaction data;

analyzing and comparing the current recurring payment financial transaction data and the baseline recurring payment data in baseline recurring payment database;

if the current recurring payment financial transaction data and the baseline recurring payment data do not match to a defined level of similarity, designating the current recurring payment financial transaction represented by the current recurring payment financial transaction data as a potentially fraudulent financial transaction and changing status data associated with the current recurring payment financial transaction data to potentially fraudulent payment financial transaction data; and performing one or more protective actions on the potentially fraudulent payment financial transaction data.

2. The method for identifying potentially fraudulent bill and invoice payments of claim 1, wherein the personal financial management and bill payment system is a financial transaction management and bill payment system through which a user of the financial transaction management and bill payment system is provided the capability to categorize financial transactions and pay the customer user's bills.

3. The method for identifying potentially fraudulent bill and invoice payments of claim 1, wherein the recurring payment financial transaction data includes recurring payee data indicating a payee associated with recurring payments identified in the recurring payment financial transaction data.

4. The method for identifying potentially fraudulent bill and invoice payments of claim 1, wherein the recurring payment financial transaction data includes recurring product data indicating a product associated with recurring payments identified in the recurring payment financial transaction data.

5. The method for identifying potentially fraudulent bill and invoice payments of claim 1, wherein the recurring payment financial transaction data includes recurring service data indicating a service associated with recurring payments identified in the recurring payment financial transaction data.

6. The method for identifying potentially fraudulent bill and invoice payments of claim 1, wherein the baseline recurring payment data associated with recurring payments financial transaction includes one or more of:

recurring payee data indicating a payee associated with recurring payments identified in the recurring payment financial transaction data;

recurring product data indicating a product associated with recurring payments identified in the recurring payment financial transaction data;

recurring service data indicating a service associated with recurring payments identified in the recurring payment financial transaction data;

recurring payment amount data indicating a payment amount associated with recurring payments identified in the recurring payment financial transaction data;

recurring payment frequency data indicating a frequency of payment associated with recurring payments identified in the recurring payment financial transaction data;

recurring payment date data indicating a date associated with recurring payments identified in the recurring payment financial transaction data; and recurring payment day data indicating a day associated with recurring payments identified in the recurring payment financial transaction data.

7. The method for identifying potentially fraudulent bill and invoice payments of claim 1, wherein the defined level of similarity between the current recurring payment financial transaction data and the baseline recurring payment data includes one or more of:

a defined level or range of similarity between the recurring payee data of the current recurring payment financial transaction data and the recurring payee data of the baseline recurring payment data;

a defined level or range of similarity between the recurring product data of the current recurring payment financial transaction data and the recurring product data of the baseline recurring payment data;

a defined level or range of similarity between the recurring service data of the current recurring payment financial transaction data and the recurring service data of the baseline recurring payment data;

a defined level or range of similarity between the recurring payment amount data of the current recurring payment financial transaction data and the recurring payment amount data of the baseline recurring payment data;

a defined level or range of similarity between the recurring payment frequency data of the current recurring payment financial transaction data and the recurring payment frequency data of the baseline recurring payment data;

a defined level or range of similarity between the recurring payment date data of the current recurring payment financial transaction data and the recurring payment date data of the baseline recurring payment data; and a defined level or range of similarity between the recurring payment day data of the current recurring payment financial transaction data and the recurring payment day data of the baseline recurring payment data.

8. The method for identifying potentially fraudulent bill and invoice payments of claim 1, wherein performing one or more protective actions on the potentially fraudulent payment financial transaction data includes preventing the payment represented by the potentially fraudulent payment financial transaction data.

9. The method for identifying potentially fraudulent bill and invoice payments of claim 1, wherein performing one or more protective actions on the potentially fraudulent payment financial transaction data includes forwarding the potentially fraudulent payment financial transaction data to a designated representative and/or agent of the user.

10. The method for identifying potentially fraudulent bill and invoice payments of claim 1, wherein performing one or more protective actions on the potentially fraudulent payment financial transaction data includes forwarding the potentially fraudulent payment financial transaction data to a designated representative of the personal financial management and bill payment system.

11. A system for identifying potentially fraudulent bill and invoice payments, the method comprising:

a personal financial management and bill payment system;

a financial transaction data access module for obtaining access to personal financial management and bill payment system user financial transaction data representing financial transactions associated with users of the personal financial management and bill payment system, the personal financial management and bill payment system user financial transaction data including financial transaction data from two or more sources of financial transaction data;

a recurring payment identification module for analyzing the personal financial management and bill payment system user financial transaction data associated with a user to identify recurring payment financial transaction data representing recurring payments made by the user;

a baseline recurring payment data generation module for analyzing the recurring payment financial transaction data for each identified recurring payment financial transaction associated with the user to determine baseline recurring payment data associated with that recurring payment financial transaction;

a correlation module for correlating the recurring payment financial transaction data and the baseline recurring payment data associated with the recurring payment financial transaction data;

a baseline recurring payment database for storing the correlated recurring payment financial transaction data and the baseline recurring payment data associated with the recurring payment financial transaction data;

a monitoring module for monitoring current personal financial management and bill payment system user financial transaction data representing current financial transactions associated with the user of the personal financial management and bill payment system;

current recurring payment financial transaction data identification module for analyzing current personal financial management and bill payment system user financial transaction data to identify current recurring payment financial transaction data in the current personal financial management and bill payment system user financial transaction data;

identified current recurring payment financial transaction data;

a comparison module for analyzing and comparing the current recurring payment financial transaction data and the baseline recurring payment data in baseline recurring payment database;

a status determination module for designating the current recurring payment financial transaction represented by the current recurring payment financial transaction data as a potentially fraudulent financial transaction and changing status data associated with the current recurring payment financial transaction data to potentially fraudulent payment financial transaction data if the current recurring payment financial transaction data and the baseline recurring payment data do not match to a defined level of similarity; and a protective action implementation module for performing one or more protective actions on the potentially fraudulent payment financial transaction data.

12. The system for identifying potentially fraudulent bill and invoice payments of claim 11, wherein the personal financial management and bill payment system is a financial transaction management and bill payment system through which a user of the financial transaction management and bill payment system is provided the capability to categorize financial transactions and pay the customer user's bills.

13. The system for identifying potentially fraudulent bill and invoice payments of claim 11, wherein the recurring payment financial transaction data includes recurring payee data indicating a payee associated with recurring payments identified in the recurring payment financial transaction data.

14. The system for identifying potentially fraudulent bill and invoice payments of claim 11, wherein the recurring payment financial transaction data includes recurring product data indicating a product associated with recurring payments identified in the recurring payment financial transaction data.

15. The system for identifying potentially fraudulent bill and invoice payments of claim 11, wherein the recurring payment financial transaction data includes recurring service data indicating a service associated with recurring payments identified in the recurring payment financial transaction data.

16. The system for identifying potentially fraudulent bill and invoice payments of claim 11, wherein the baseline recurring payment data associated with recurring payments financial transaction includes one or more of:

recurring payee data indicating a payee associated with recurring payments identified in the recurring payment financial transaction data;

recurring product data indicating a product associated with recurring payments identified in the recurring payment financial transaction data;

recurring service data indicating a service associated with recurring payments identified in the recurring payment financial transaction data;

recurring payment amount data indicating a payment amount associated with recurring payments identified in the recurring payment financial transaction data;

recurring payment frequency data indicating a frequency of payment associated with recurring payments identified in the recurring payment financial transaction data;

recurring payment date data indicating a date associated with recurring payments identified in the recurring payment financial transaction data; and recurring payment day data indicating a day associated with recurring payments identified in the recurring payment financial transaction data.

17. The system for identifying potentially fraudulent bill and invoice payments of claim 11, wherein the defined level of similarity between the current recurring payment financial transaction data and the baseline recurring payment data includes one or more of:

a defined level or range of similarity between the recurring payee data of the current recurring payment financial transaction data and the recurring payee data of the baseline recurring payment data;

a defined level or range of similarity between the recurring product data of the current recurring payment financial transaction data and the recurring product data of the baseline recurring payment data;

a defined level or range of similarity between the recurring service data of the current recurring payment financial transaction data and the recurring service data of the baseline recurring payment data;

a defined level or range of similarity between the recurring payment amount data of the current recurring payment financial transaction data and the recurring payment amount data of the baseline recurring payment data;

a defined level or range of similarity between the recurring payment frequency data of the current recurring payment financial transaction data and the recurring payment frequency data of the baseline recurring payment data;

a defined level or range of similarity between the recurring payment date data of the current recurring payment financial transaction data and the recurring payment date data of the baseline recurring payment data; and a defined level or range of similarity between the recurring payment day data of the current recurring payment financial transaction data and the recurring payment day data of the baseline recurring payment data.

18. The system for identifying potentially fraudulent bill and invoice payments of claim 11, wherein performing one or more protective actions on the potentially fraudulent payment financial transaction data includes preventing the payment represented by the potentially fraudulent payment financial transaction data.

19. The system for identifying potentially fraudulent bill and invoice payments of claim 11, wherein performing one or more protective actions on the potentially fraudulent payment financial transaction data includes forwarding the potentially fraudulent payment financial transaction data to a designated representative and/or agent of the user.

20. The system for identifying potentially fraudulent bill and invoice payments of claim 11, wherein performing one or more protective actions on the potentially fraudulent payment financial transaction data includes forwarding the potentially fraudulent payment financial transaction data to a designated representative of the personal financial management and bill payment system.

21. A computer program product for identifying potentially fraudulent bill and invoice payments, the computer program product including machine readable instructions for implementing a process for identifying potentially fraudulent bill and invoice payments, the process for identifying potentially fraudulent bill and invoice payments comprising:
   providing a personal financial management and bill payment system;
   obtaining access to personal financial management and bill payment system user financial transaction data representing financial transactions associated with users of the personal financial management and bill payment system, the personal financial management and bill payment system user financial transaction data including financial transaction data from two or more sources of financial transaction data;
   analyzing the personal financial management and bill payment system user financial transaction data associated with a user to identify recurring payment financial transaction data representing recurring payments made by the user;
   for each identified recurring payment financial transaction associated with the user, analyzing the recurring payment financial transaction data to determine baseline recurring payment data associated with that recurring payment financial transaction;
   correlating the recurring payment financial transaction data and the baseline recurring payment data associated with the recurring payment financial transaction data;
   storing the correlated recurring payment financial transaction data and the baseline recurring payment data associated with the recurring payment financial transaction data in a baseline recurring payment database;
   monitoring current personal financial management and bill payment system user financial transaction data representing current financial transactions associated with the user of the personal financial management and bill payment system;
   analyzing current personal financial management and bill payment system user financial transaction data to identify current recurring payment financial transaction data in the current personal financial management and bill payment system user financial transaction data;
   identifying current recurring payment financial transaction data in the current personal financial management and bill payment system user financial transaction data;
   analyzing and comparing the current recurring payment financial transaction data and the baseline recurring payment data in baseline recurring payment database;
   if the current recurring payment financial transaction data and the baseline recurring payment data do not match to a defined level of similarity, designating the current recurring payment financial transaction represented by the current recurring payment financial transaction data as a potentially fraudulent financial transaction and changing status data associated with the current recurring payment financial transaction data to potentially fraudulent payment financial transaction data; and
   performing one or more protective actions on the potentially fraudulent payment financial transaction data.

22. The computer program product for identifying potentially fraudulent bill and invoice payments of claim 21, wherein the personal financial management and bill payment system is a financial transaction management and bill payment system through which a user of the financial transaction management and bill payment system is provided the capability to categorize financial transactions and pay the customer user's bills.

23. The computer program product for identifying potentially fraudulent bill and invoice payments of claim 21, wherein the recurring payment financial transaction data includes recurring payee data indicating a payee associated with recurring payments identified in the recurring payment financial transaction data.

24. The computer program product for identifying potentially fraudulent bill and invoice payments of claim 21, wherein the recurring payment financial transaction data includes recurring product data indicating a product associated with recurring payments identified in the recurring payment financial transaction data.

25. The computer program product for identifying potentially fraudulent bill and invoice payments of claim 21, wherein the recurring payment financial transaction data includes recurring service data indicating a service associated with recurring payments identified in the recurring payment financial transaction data.

26. The computer program product for identifying potentially fraudulent bill and invoice payments of claim 21, wherein the baseline recurring payment data associated with recurring payments financial transaction includes one or more of:
   recurring payee data indicating a payee associated with recurring payments identified in the recurring payment financial transaction data;
   recurring product data indicating a product associated with recurring payments identified in the recurring payment financial transaction data;
   recurring service data indicating a service associated with recurring payments identified in the recurring payment financial transaction data;
   recurring payment amount data indicating a payment amount associated with recurring payments identified in the recurring payment financial transaction data;
   recurring payment frequency data indicating a frequency of payment associated with recurring payments identified in the recurring payment financial transaction data;
   recurring payment date data indicating a date associated with recurring payments identified in the recurring payment financial transaction data; and recurring payment day data indicating a day associated with recurring payments identified in the recurring payment financial transaction data.

27. The computer program product for identifying potentially fraudulent bill and invoice payments of claim 21, wherein the defined level of similarity between the current recurring payment financial transaction data and the baseline recurring payment data includes one or more of:
- a defined level or range of similarity between the recurring payee data of the current recurring payment financial transaction data and the recurring payee data of the baseline recurring payment data;
- a defined level or range of similarity between the recurring product data of the current recurring payment financial transaction data and the recurring product data of the baseline recurring payment data;
- a defined level or range of similarity between the recurring service data of the current recurring payment financial transaction data and the recurring service data of the baseline recurring payment data;
- a defined level or range of similarity between the recurring payment amount data of the current recurring payment financial transaction data and the recurring payment amount data of the baseline recurring payment data;
- a defined level or range of similarity between the recurring payment frequency data of the current recurring payment financial transaction data and the recurring payment frequency data of the baseline recurring payment data;
- a defined level or range of similarity between the recurring payment date data of the current recurring payment financial transaction data and the recurring payment date data of the baseline recurring payment data; and
- a defined level or range of similarity between the recurring payment day data of the current recurring payment financial transaction data and the recurring payment day data of the baseline recurring payment data.

28. The computer program product for identifying potentially fraudulent bill and invoice payments of claim 21, wherein performing one or more protective actions on the potentially fraudulent payment financial transaction data includes preventing the payment represented by the potentially fraudulent payment financial transaction data.

29. The computer program product for identifying potentially fraudulent bill and invoice payments of claim 21, wherein performing one or more protective actions on the potentially fraudulent payment financial transaction data includes forwarding the potentially fraudulent payment financial transaction data to a designated representative and/or agent of the user.

30. The computer program product for identifying potentially fraudulent bill and invoice payments of claim 21, wherein performing one or more protective actions on the potentially fraudulent payment financial transaction data includes forwarding the potentially fraudulent payment financial transaction data to a designated representative of the personal financial management and bill payment system.

* * * * *